(12) United States Patent
Borst et al.

(10) Patent No.: US 9,325,467 B2
(45) Date of Patent: Apr. 26, 2016

(54) METHOD AND SYSTEM FOR CONTROLLING ALMOST BLANK SUBFRAMES (ABS) BASED ON CELL BORDER RATE RATIOS

(71) Applicants: Sem Borst, Morristown, NJ (US); Phil Whiting, New Providence, NJ (US); Markus Gruber, Stuttgart (DE); Hajo Bakker, Eberdingen (DE); Siegfried Klein, Stuttgart (DE)

(72) Inventors: Sem Borst, Morristown, NJ (US); Phil Whiting, New Providence, NJ (US); Markus Gruber, Stuttgart (DE); Hajo Bakker, Eberdingen (DE); Siegfried Klein, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 91 days.

(21) Appl. No.: 14/249,598

(22) Filed: Apr. 10, 2014

(65) Prior Publication Data

US 2015/0295685 A1    Oct. 15, 2015

(51) Int. Cl.
*H04L 5/00* (2006.01)
*H04W 24/10* (2009.01)
*H04W 72/04* (2009.01)

(52) U.S. Cl.
CPC ............ *H04L 5/0035* (2013.01); *H04L 5/0073* (2013.01); *H04W 24/10* (2013.01); *H04W 72/0446* (2013.01)

(58) Field of Classification Search
None
See application file for complete search history.

(56) References Cited

U.S. PATENT DOCUMENTS

| | | | | |
|---|---|---|---|---|
| 2013/0044704 A1* | 2/2013 | Pang | ................. | H04W 72/0426 370/329 |
| 2013/0136110 A1* | 5/2013 | Yamamoto | ........ | H04W 72/0446 370/336 |
| 2014/0094181 A1* | 4/2014 | Kakinada | .......... | H04W 28/0236 455/446 |
| 2014/0162662 A1* | 6/2014 | Nagata | ................. | H04W 28/16 455/444 |

* cited by examiner

*Primary Examiner* — Kodzovi Acolatse
(74) *Attorney, Agent, or Firm* — Harness, Dickey & Pierce, P.L.C.

(57) ABSTRACT

At least one embodiment relates to a method for controlling a number of almost blank subframes (ABS) in a heterogeneous network having a macro cell and at least one small cell of a plurality of small cells in a coverage area of the macro cell, the method includes receiving, at the macro cell, a plurality of measurements regarding both received power and received quality from a terminal, receiving, at the macro cell, a plurality of load-related values from a plurality of small cells; and determining, by the macro cell, a cost-benefit value (CBV) based on the received measurements and load values. The CBV indicates whether an increase or a decrease in the ABS would benefit the network. The method further includes selectively changing, by the macro cell, the number of ABS available to the at least one small cell based on the CBV.

10 Claims, 6 Drawing Sheets

METHOD AND SYSTEM FOR CONTROLLING ALMOST BLANK SUBFRAMES (ABS) BASED ON CELL BORDER RATE RATIOS

BACKGROUND

Heterogeneous networks (HetNets or HTNs) are now being developed wherein cells of smaller size (small cells) are embedded within the coverage area of larger macro cells and the small cells could even share the same carrier frequency with the umbrella macro cell, primarily to provide increased capacity in targeted areas of data traffic concentration. Such heterogeneous networks try to exploit the spatial distribution of users (and traffic) to efficiently increase the overall capacity of the wireless network. Those smaller-sized cells are typically referred to as pico cells or femto cells, and for purposes of the description herein will be collectively referred to as small cells. Such heterogeneous networks try to exploit the spatial variations in user (and traffic) distribution to efficiently increase the overall capacity of the wireless network.

In a co-channel network, an umbrella macro cell and the overlaid small cell(s) share the same carrier frequency, therefore, the inter-cell interference between macro and small cells becomes a challenging issue in HetNets. The inter-cell interference affects its coverage area and the effective offload capability of a small cell. The inter-cell interference may cause the UE handover failures and mobility performance degradation.

Such deployments present some specific interference scenarios for which enhanced inter-cell interference coordination (eICIC) techniques would prove beneficial.

In one scenario, the small cells are open to users of the macro cellular network. In order to ensure that such small cells carry a useful share of the total traffic load, user equipment(s) (UE(s)) may be programmed to associate preferentially with the small cells rather than the macro cells, for example by biasing the received signal power of the Common Reference Symbol (CRS), a quantity that may be referred to as reference signal received power (RSRP), such that UEs that are not too close to a small cell will associate with the small cell. Despite the association, UEs in small range extension areas or near the edge of a small cell's coverage area will suffer strong interference from one or more macro cells. In order to alleviate such interference, some subframes may be configured as "almost blank" in the macro cell. An "almost blank" subframe (ABS) is a subframe with reduced transmit power (e.g., reduced from a maximum transmit power) and/or a reduced activity subframe (e.g., contains only control information as compared to a fully loaded subframe). Legacy UEs (also called terminals) expect to find the reference signals for measurements but are unaware of the configuration of these special subframes.

SUMMARY

One or more embodiments relate to a method for controlling a number of almost blank subframes (ABS) in a heterogeneous network having a macro cell and at least one small cell of a plurality of small cells in a coverage area of the macro cell.

According to one embodiment, the method includes receiving, at the macro cell, a plurality of measurements regarding both received power and received quality from a terminal, receiving, at the macro cell, a plurality of load-related values from a plurality of small cells, and determining, by the macro cell, a cost-benefit value (CBV) based on the received measurements and load values. The CBV indicates whether an increase or a decrease in the ABS would benefit the network. The method further includes selectively changing, by the macro cell, the number of ABS available to the at least one small cell based on the CBV.

According to one embodiment, the received measurements are based on at least one handover-related event between the macro cell and the at least one small cell.

According to one embodiment, the CBV is determined when a threshold value for a load in the macro cell and for the at least one small cell, is reached.

According to one embodiment, the determining a CBV further includes calculating, for the at least one small cell and each of the plurality of small cells, the CBV based on at least one ratio between an estimated small cell-to-terminal transmission rate per resource unit and an estimated macro cell-to-terminal transmission rate per resource unit.

According to one embodiment, the determining a CBV further includes multiplying the at least one ratio by a load-related factor for the at least one small cell and each of the plurality of small cells.

According to one embodiment, selectively changing the number of ABS further includes comparing a sum of the multiplied ratios across the at least one small cell and each of the plurality of small cells with a threshold.

According to one embodiment, triggering performance of the method for controlling a number of ABS, is based on a handover-related event from the macro cell to the at least one small cell.

According to one embodiment, the macro cell determines if the small cell has non-ABS resources based on a resource threshold value RTH, and reduces the CBV if the at least one small cell does not have adequate non-ABS resources.

At least one embodiment is directed to a system for controlling a number of almost blank subframes (ABS) for a macro cell in a heterogeneous network having a macro cell and at least one small cell of a plurality of small cells.

According to one embodiment, the macro cell is configured to receive a plurality of measurements regarding a received power and a received quality at a terminal, receive a plurality of load-related values from the at least one small cell, and determine a cost-benefit value (CBV) based on the received measurements and load values. The CBV indicates whether an increase or a decrease in the ABS would benefit the network. The macro cell selectively changes the number of ABS available to the at least one small cell, based on the CBV.

According to one embodiment, the at least one small cell is embedded in a coverage area of the macro cell, and the at least one small cell is configured to increase a cell range and increase an amount of supported traffic, based on an increase in available ABS. The at least one small cell is also configured to decrease a cell range and decrease an amount of supported traffic, based on a decrease in available ABS.

At least one embodiment is directed to a method of controlling a number of almost blank subframes (ABS) in a heterogeneous network having a macro cell and at least one small cell of a plurality of small cells, based on measurements received during a handover-related event from the small cell to the macro cell.

According to one embodiment, data is received regarding the handover-related event (A3 event), and information for determining a ratio between an estimated small cell-to-terminal transmission rate per resource unit and an estimated macro-cell-to-terminal transmission rate per resource unit. The method further includes determining an amount of available ABS transmitted to the macro cell.

BRIEF DESCRIPTION OF THE DRAWINGS

Example embodiments will be more clearly understood from the following detailed description taken in conjunction with the accompanying drawings. FIGS. 1-8B represent non-limiting, example embodiments as described herein.

FIG. 1 illustrates a wireless communication system according to an example embodiment;

FIG. 2 illustrates a macro cell shown in FIG. 1 including border areas;

FIG. 3 illustrates a system when a user equipment (UE) is at a cell border area;

FIG. 4 illustrates a method of optimizing a number of almost blank subframes (ABS) in a heterogeneous network having a macro cell and at least one small cell according to an example embodiment;

FIG. 5 illustrates a method of optimizing a number of almost blank subframes (ABS) in a heterogeneous network having a macro cell and at least one small cell according to an example embodiment;

DETAILED DESCRIPTION

Figure 1:
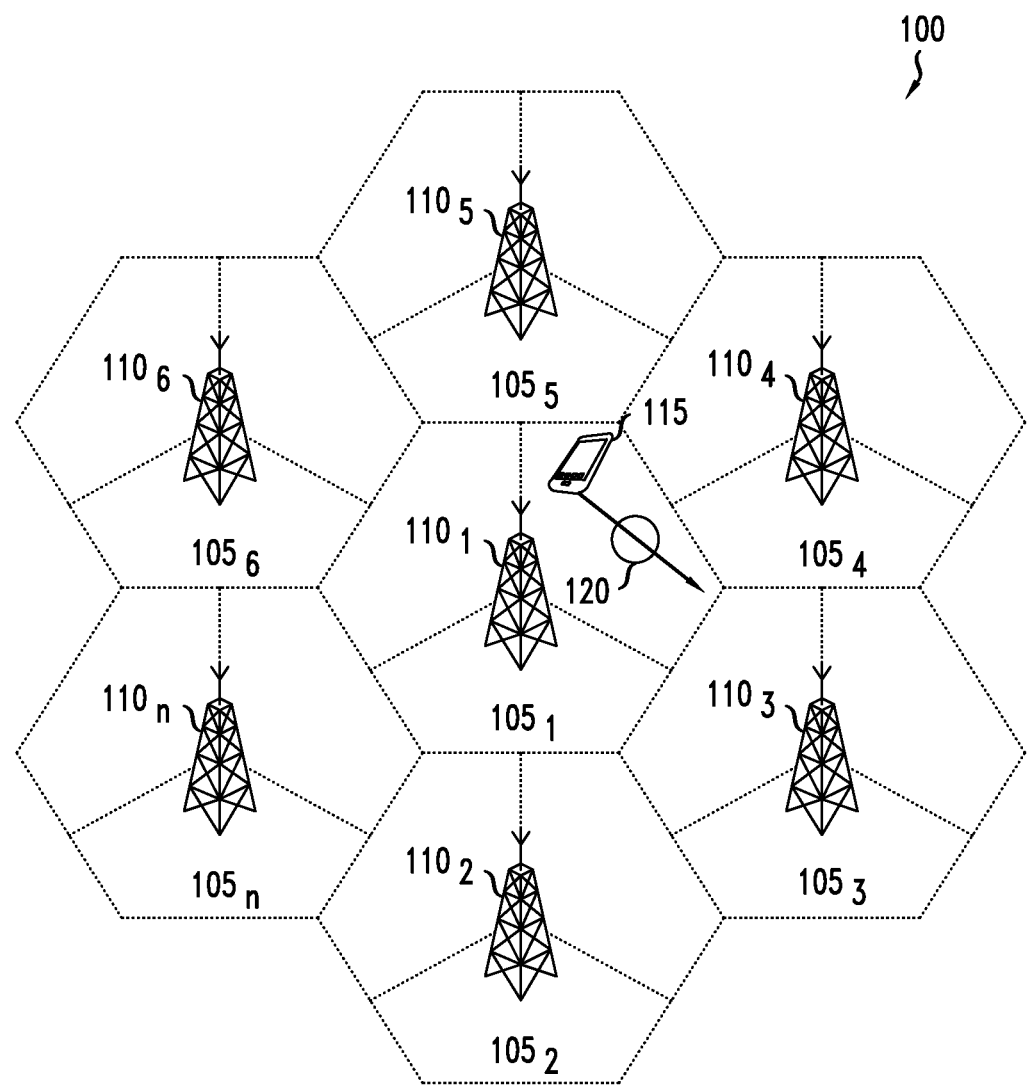

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "storage unit" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "user equipment" or "UE" may be synonymous to a user equipment, mobile station, mobile user, access terminal, mobile terminal, user, subscriber, wireless terminal, terminal and/or remote station and may describe a remote user of wireless resources in a wireless communication network. Accordingly, a UE may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may also generally be applicable to architectures where that distinction is not so clear, such as ad hoc and/or mesh network architectures, for example.

Communication from the base station to the UE is typically called downlink or forward link communication. Communication from the UE to the base station is typically called uplink or reverse link communication.

Serving base station may refer to the base station currently handling communication needs of the UE.

In HetNets, an existing cell of a mobile communication system such as LTE (macro cell) can be augmented by deploying additional small cells (micro or small cells).

Since Long Term Evolution (LTE) is a co-channel deployment (i.e., it has 1:1 frequency re-use in the different cells) and all the uplink and downlink traffic are scheduled by the base station via a downlink control channel (PDCCH), the edge users' downlink performance can be impaired due to interference received from neighboring cells that use the same frequency due to 1:1 re-use.

EICIC (enhanced inter-cell interference coordination) is an interference mitigation technique that involves the transmission of ABS from a macro cluster. During the transmission of ABS, only a subset of the broadcast channels is transmitted while PDSCH is muted. This allows underlaid small cells such as metro cells, femto cells and relays to transmit to the UEs that have selected those nodes with a better SINR.

In order to mitigate interference at the edge of the micro cells, some ABSs of the macro cell are almost unused by the macro cell. Smaller cells (micro, pico etc.) can flexibly extend and shrink their coverage by means of a bias value (in db), and because of the ABS, the small cells benefit from reduced interference and according to one or more example embodiments, can substantially extend their coverage in order to make use of almost blank subframes (ABSs) effective, signaling is provided from the macro cell to the small cell across the corresponding backhaul interface, known in LTE as the "X2" interface between the cells. For LTE Release 10, it has been agreed that this X2 signaling will take the form of a coordination bitmap to indicate the ABS pattern (for example with each bit corresponding to one subframe in a series of subframes, with the value of the bit indicating whether the subframe is an ABS or not). Such signaling can help the small cell to schedule data transmissions in the small cell appropriately to avoid interference (e.g. by scheduling transmissions to UEs near the edge of the small cell during ABSs), and to signal to the UEs the subframes which should have low macro cellular interference and should therefore be used for RRM/RLM/CQI measurements. (RRM=Radio Resource Management, typically relating to handover; RLM=Radio Link Monitoring, typically relating to detection of serving radio link failure; CQI=Channel Quality Information, derived from the signal strength from the serving cell and the interference from other cells, and typically used for link adaptation and scheduling on the serving radio link).

With a large number of moving UEs in an area with multiple macro and small cells, configuring ABS dynamically in conjunction with cell range extension (CRE) is also very challenging. ABS is not tailored for individual UEs.

Once the macro cell reaches a critical load and the small cells cannot help offload it by extending their coverage, the fraction of ABS can be decreased so that the macro cell is no longer in critical mode. That the small cells would suffer from higher interference can be considered as acceptable because not decreasing the fraction of ABS, would result in blocked/dropped users in the macro cell. However, this scenario does not take into account whether it is the macro cell or the small cell that can accommodate more traffic by an increase/decrease of ABS, especially if there are multiple small cells involved. In other words, an increase in ABS can be more appropriate than a decrease in ABS and vice versa depending on the prevailing conditions.

FIG. 1 illustrates a wireless communication system according to an example embodiment. Referring to FIG. 1, the wireless communication system includes a heterogeneous network 100 (HetNet), where cells of smaller footprint size (e.g., small cells) are embedded within the coverage area of a larger macro cell (e.g., the area served by a macro base station) or at least partially overlapped by the larger macro cell. As used herein, the terminology "cell" refers to the coverage area as well as the base station serving the coverage area. It will be understood that each cell has an associated base station.

As shown, a plurality of macro cells $105_1$-$105_n$ are arranged in a hexagonal grid of cells. ENodeBs $110_1$-$110_n$ serve the plurality of macro cells $105_1$-$105_n$, respectively. A user equipment (UE) 115 within the cell $105_1$ may communicate with the eNodeB $110_1$. Since the UE 115 is within the macro cell $105_1$ and has its communication needs handled by the eNodeB $110_1$ the eNodeB $110_1$ may be referred to as a serving base station.

The eNodeB $110_1$ communicates with the UE 115 (and vice versa) via at least one air interface that supports transmission of data between the eNodeB $110_1$ and the UE 115. Techniques for establishing, maintaining, and operating the air interfaces between the UE 115 and the eNodeB $110_1$ to provide uplink and/or downlink wireless communication channels (PDCCH, PDSCH, PUCCH) between the UE 115 and the eNodeB $110_1$ are known in the art and in the interest of clarity only those aspects of establishing, maintaining, and operating the air interfaces that are relevant to the present disclosure will be discussed herein.

Small cells may be overlaid in each of the macro cells $105_1$-$105_n$. Example embodiments encompass any number and type of small cell. For example, the phrase "small cell" may refer to any relatively small cell or access point, such as a femto cell, femto access point (or base station), small cell, small access point (or base station), micro cell, micro access point (or base station), metro cell, metro access point (or base station), nano cell, nano access point (or base station), etc.

For purposes of illustration, a small cell 120 is shown embedded in the coverage area of the macro cell $105_1$. The small cell 120 may be a pico cell or femto cell. However, small cells are not limited to being femto or pico cells.

Moreover, the UE 115 is travelling at a speed towards the small cell 120.

The network 100 is an LTE network. However, it should be understood that example embodiments are not limited thereto.

Figure 2:
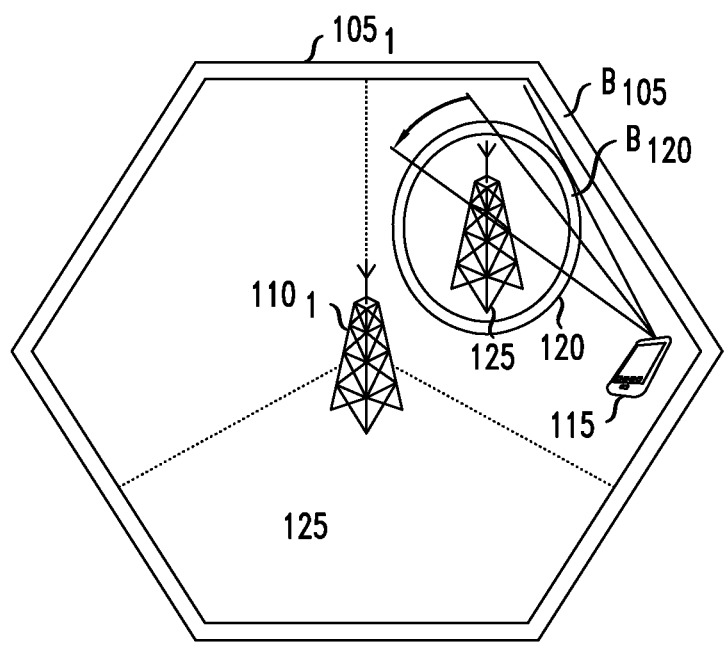

FIG. 2 illustrates the macro cell $105_1$, shown in FIG. 1. As shown, a small cell eNB 125 provides communications to equipment within the small cell 120.

Both the macro eNB $110_1$ and the small cell eNB 125 are configured to determine a speed and/or velocity of the UE 115. The small cell eNB 125 may be a pico cell base station, femto base station or any other type of small cell base station.

As shown in FIG. 2, a macro cell $105_1$ includes a cell border $B_{105}$ and a small cell 120A includes a border $B_{120}$. The border between the macro cell $105_1$ and the small cell 120A is in terms of the relative power measurement at the coverage area. Without small cell range extension, if at a certain coverage area, the measured power from the macro cell $105_1$ and the small cell 120A are the same or close, the coverage area is at the border of the two cells. The macro cell $105_1$ and the small cell 120A configure the UEs to determine the border $B_{120}$ based on the measured powers received from the macro cell $105_1$ and the small cell 120A.

Radio Resource Control (RRC) control signaling and signaling support small cell eNB local scheduling will be delivered from the macro cell eNB to small cell eNB via an X2 interface. In an example embodiment, the data could be from macro cell eNB or from a serving gateway.

System Architecture

Figure 3:
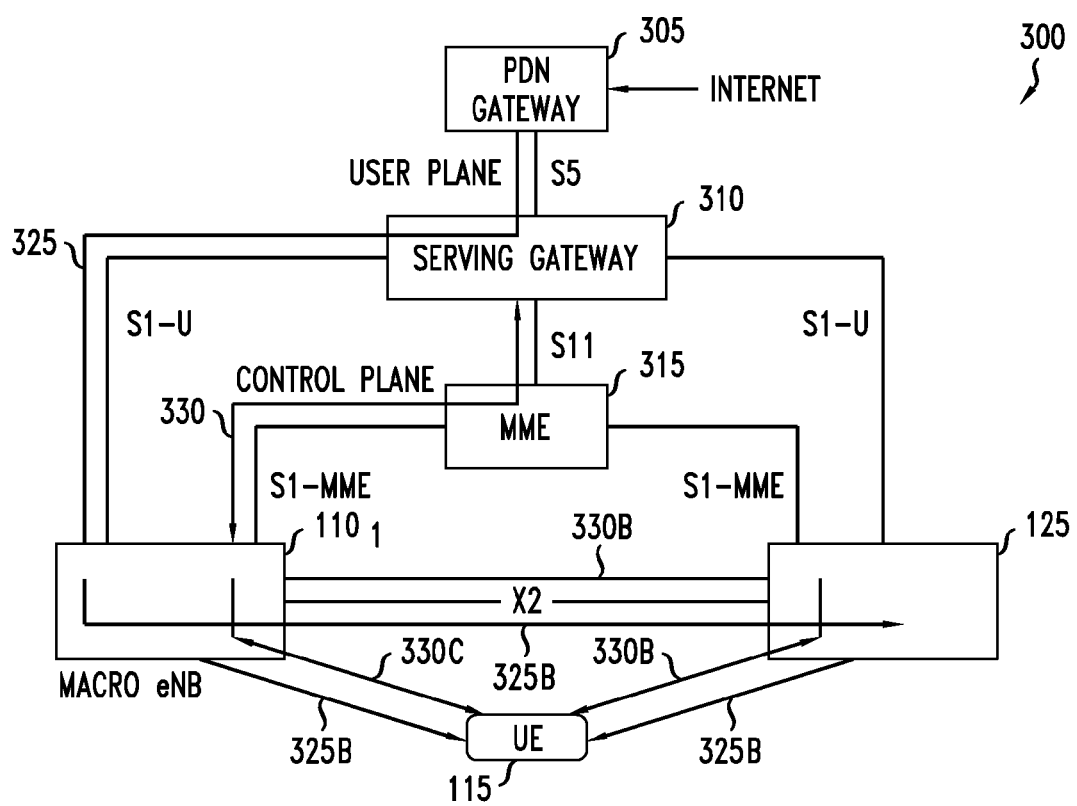

FIG. 3 illustrates a system according to an example embodiment of the present invention.

As shown in FIG. 3, a system 300 includes a packet data network (PDN) gateway (PGW) 305, a serving gateway 310, a mobility management entity (MME) 315, the macro eNB $110_1$, the small cell eNB 125 and the UE 115. Further, the system 300 may include other elements of an LTE core network, and the system 300 is not limited to the features shown in FIG. 3.

The PDN gateway 305 is communicatively connected to the serving gateway 310 through an S5 interface, which is a known interface defined by LTE standards.

The SGW 310 and the MME 315 may be connected through an S11 interface, which is a known interface defined by LTE standards.

The MME 315 is connected to the macro eNB $110_1$ and the small cell eNB 125 via respective S1-MME interfaces, which is a known interface defined by LTE standards. The MME 315 manages network operations including handling the establishment of connections between UEs and a core network via eNBs, and the handling of tracking and paging for idle UEs, for example, idle UEs camping on one of the cells of the macro eNB 110 or the small cell eNB 125.

The SGW 310 is connected to the eNBs $110_1$, 125 through respective S1-U interfaces.

Further, the macro eNB $110_1$ and the small cell eNB 125 are communicatively connected to each other through an X2 interface. As shown, the macro eNB $110_1$ includes the small cell eNB 125.

As shown in FIG. 3, a user plane 325, including a data stream, exists from the PDN Gateway 305, through the serving gateway 310 and to the macro eNB $110_1$. The MME 315 decides whether the user plane 325 is anchored at the macro eNB $110_1$. For example, the MME 315 may decide whether the user plane 325 is anchored at the macro eNB $110_1$ based on information of the UE 115 (e.g., the speed of the UE, the location of the UE and the measurement report of the UE) and the system 300 (e.g., load and buffer status). A control plane (Radio Resource Management (RRM)/Radio Resource Control (RRC)) 330 exists from the MME 315 to the macro eNB 110. There is also control signaling from MME 315 to the serving gateway 310.

The control plane 330 includes the RRM mechanism between the MME 315 and eNBs $110_1$, 125 and RRC between the eNBs $110_1$, 125 and UEs. The MME 315 determines whether the control plane 330 is anchored at the macro eNB $110_1$ based on the UE's information and system information (e.g., load).

The user plane 325 may be understood as communications using packet data convergence protocol (PDCP), radio link control (RLC), media access control (MAC) and physical (PHY) layers of a protocol stack. The PDCP layer is to handle the UE mobility (handover) between the cells. When the MME 315 decides that a UE stays with the macro eNB $110_1$, the MME 315 will instruct the macro eNB $110_1$ that a PDCP layer is kept in the macro eNB $110_1$. Independent RLC, MAC and PHY layers are maintained at the macro and small cell eNBs $110_1$, 125.

It is possible to support RRC signaling diversity (not necessarily synchronized combine). RRC diversity means the same RRC message is transmitted by more than one eNB to the same UE.

In an example embodiment, the macro eNB $110_1$ may monitor link conditions of the streams 325a and 325b. The UE 115 provides link measurements/channel quality indicators (CQI) to the macro eNB $110_1$ over the stream 330a of the control plane 330 at the air interface. The UE 115 may increase a transmit power for providing the link measurements/channel quality indicators (CQI) to the small cell eNB 125, such that the link measurements/channel quality indicators transmission may be received by the macro eNB $110_1$. The small cell eNB 125 also reports its buffer status periodically to the macro eNB $110_1$ via the backhaul X2.

According to exemplary embodiments, an estimation is performed to determine whether an increase or a decrease in ABS would be more beneficial for the level or resource utilization required to support a given traffic volume, or equivalently, for the volume of traffic that can be accommodated for a given amount of resources in a constant/guaranteed bit rate traffic scenario.

Theory of Operation

According to an example embodiment, a cost benefit value (CBV) is determined. The CBV represents a value that is used to estimate whether an increase or decrease in ABS resources would be beneficial to the communication system.

According to an example embodiment, a CBV greater than or equal to a threshold (or alternatively, a predetermined) threshold T indicates that an increase in ABS would be most beneficial. A CBV that is smaller than the threshold, or is otherwise below the desired value, indicates that a decrease of ABS would be most beneficial. The threshold T, may be a design parameter determined through empirical study. For example, in one embodiment, the threshold T, may have a value of 1.

According to an example embodiment, the CBV is determined as $(R_{i,s}/R_{i,m})*F_i$ summed up over all small cells i=1 ... N hence:

$$CBV = \sum_{i=1}^{N}(R(i,s)/R(i,m))*Fi \quad (1)$$

where $R_{i,s}$ and $R_{i,m}$ represent the physical transmission rates per resource unit at the discriminative line between the macro cell and the i-th small cell achievable by the i-th small cell and the macro cell, respectively; and Fi is a load-related factor reflecting the extent to which the i-th small cell is able to realize the potential gains from additional resources. It should be noted that the sum over all small cells stands for the spatial reuse of the radio resources.

The above description assumes that the small cell has abundant non-ABS resources (R). If R is above a resource threshold, RTH, the non-ABS resources are fully utilized, then granting additional ABS resources and thus reducing the amount of available non-ABS resources will force the small cell to serve traffic that was previously served during non-ABS time instead during ABS time.

If the non-ABS resources of the small cell i are fully utilized, the term corresponding to that cell in the formula for CBV should be reduced by a factor, thereby resulting in a reduced CBV or CBV'.

$$(1 - R\_CBW^{\text{non-ABS}}(i)/R\_CBW^{\text{ABS}}(i)), \quad (2)$$

Where R_CBW^non-ABS [i] and R_CBW^ABS [i] denote the physical transmission rates per resource unit at the cell border window of the small cell i during non-ABS and ABS frames, respectively.

For every additional unit of ABS resources granted, and hence unit reduction in non-ABS resources, this will take away a fraction R_CBW^non-ABS (i)/R_CBW^ABS (i), with R_CBW^non-ABS [i] and R_CBW^ABS [i] denoting the physical transmission rates per resource unit at the cell border window of the small cell i during non-ABS and ABS frames, respectively, and effectively only leave a fraction 1−R_CBW^non-ABS (i)/R_CBW^ABS (i) of the granted additional unit of ABS resources available. Hence, if the small cell does not have enough resources, for example if R is not below the desired resource threshold, a cost-benefit value that reflects the small cell's lack of available non-ABS resources, CBV', is determined.

The term $(R_{i,s}/R_{i,m})*F_i$ in the summation should therefore be reduced by a factor $(1-R\_CBW^{\text{non-ABS}}(i)/R\_CBW^{\text{ABS}})(i)$ accordingly. Therefore, a reduced cost-benefit value CBV' is calculated that reflects the small cell's insufficient non-ABS resources.

$$CBV' = CBV - (1 - R\_CBW^{\text{non-ABS}}(i)/R\_CBW^{\text{ABS}}(i)) \quad (3)$$

Obtaining the Physical Transmission Rates

The physical transmission rates per resource unit $R_{i,s}$ and $R_{i,m}$ discussed above, are determined by the macro from the signal-to-interference-and-noise ratio (SINR) of the macro cell and small cell. For example the $R_{i,s}$ and $R_{i,m}$ (or channel capacity) are determined using the well-known Shannon-Hartley theorem.

As known in the art, whenever there is a handover (HO) from the macro cell to a small cell, terminals measure and report an A3 event (according to 3GPP) RSRP and RSRQ values (definitions of RSRP, RSRQ, and RSSI from 3GPP TS 36.214) indicative for the discriminative line between one cell and the other. The following equations are then applied:

$$\text{SINRmacro} = \text{RSRPmacro}/(RSSI/N - \text{RSRPmacro}) \quad (4)$$

where RSRP represents the signal and RSSI/N represents the signal plus interference plus noise (with N being the number of resource blocks of the carrier on which the measurements are carried out).

$$RSRQ\text{macro} = N*\text{RSRPmacro}/RSSI \quad (5)$$

(by definition according to 3GPP TS 36.214) RSSI is then substituted so that:

$$\text{SINRmacro} = RSRQ\text{macro}/(1 - RSRQ\text{macro}) \quad (6)$$

The macro then derives the physical transmission rate $R_{i,m}$ from its perspective by using the SINR.

Likewise, according to example embodiments, the SINRsmall is calculated. In this case, however, the signal, i.e. the RSRP is determined from the macro cell because of the blanking of the subframes and the correspondingly reduced interference. Thus, $$\text{SINRsmall} = \text{RSRPsmall}/(RSSI/N - \text{RSRPsmall} - \text{RSRPmacro}) \quad (7)$$

therefore, SINRsmall becomes:

$$\text{SINRsmall} = (\text{RSRPsmall}*RSRQ\text{small})/(\text{RSRPsmall} - \text{RSRPsmall}*RSRQ\text{small} - \text{RSRPmacro}*RSRQ\text{small}) \quad (8)$$

According to an example embodiment, the factor Fi is border load, i.e. the percentage of ABS resources used by cell border terminals in small cell i (cell border terminals are those that are only part of the small because of the cell range extension thanks to the bias). For example, according to an embodiment Fi is determined by a target value, or alternately a measured value for the average utilization of ABS resources in the small cell i over a suitably selected time interval. The scope for potential gains from additional resources by a small cell with 100% border load, for instance, is 20 times higher than the likelihood of a small cell with 5% load. If the cell border load is not available, the overall load in the small cell would also give a good estimate and is also a good candidate for Fi. According to example embodiments, the cell border load might be standardized or be a private X2 message.

Methods for Controlling ABS Based on the Theory of Operation

Figure 4:
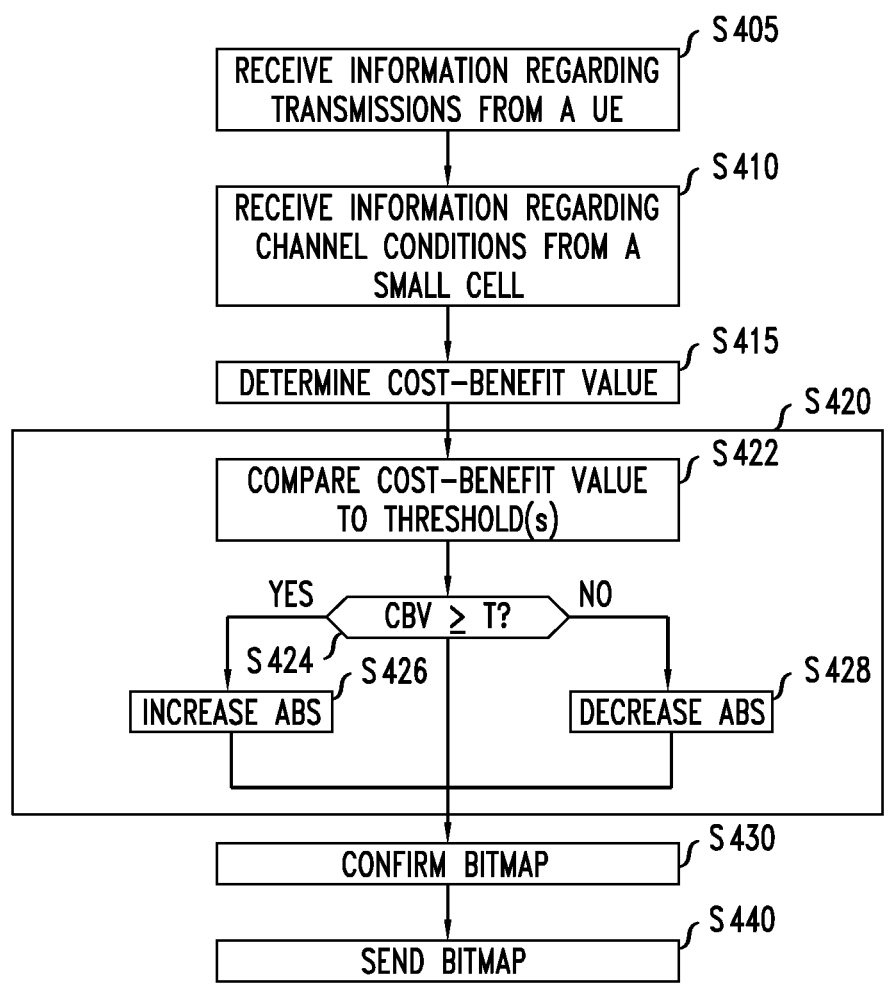

FIG. 4 illustrates a method of controlling a number of almost blank subframes (ABS) in a heterogeneous network having a macro cell and at least one small cell, according to an example embodiment. The method of FIG. 4 may be performed by the macro eNB $110_1$ and implemented in accordance with example embodiments described with reference to FIG. 3.

At S405, the macro eNB $110_1$ obtains from the UE at each handover information measurements, such as received power and received quality, of reference signals transmitted by the macro cell.

Similarly, the small cell obtains from the UE, at each handover from the small cell to the macro cell, information on both the received power and the received quality of the reference signals transmitted by the small cell.

At S410, the macro cell base station receives channel conditions between the UE and the small cell base station. For example, according to an embodiment, in addition to the channel conditions several load-related values from the small cell, such as border load, i.e. the percentage of ABS resources used by cell border terminals in small cell i are also received by the macro cell base station (cell border terminals are those that are only part of the small cell because of the cell range extension thanks to the bias).

At S415, the macro cell determines if the small cell has adequate non-ABS resources available. If the macro cell determines that the availability of non-ABS resources R, is above a desired resource threshold RTH, then at S417 the CBV is determined. The CBV is based on the received power and load values according to equation (1).

If the macro cell determines that the small cell does not have adequate non-ABS resources, then at S419 a CBV' is determined. CBV' is a reduced CBV as discussed above.

After this point, CBV and CBV' are used interchangeably according to equation (3). According to another example embodiment, the CBV is determined based on a weighted average over a plurality of handover events.

At S420, according to example embodiments, the macro cell decides to increase or decrease a number of ABS based on the CBV. As shown in FIG. 4, S420 may include sub-steps S422, S424, S426 and S428.

At S422, according to an example embodiment, the macro cell compares CBV to the threshold T.

At S424 the macro cell determines if the CBV is greater than or equal to a threshold T.

In an example embodiment, where T is equal to 1, if CBV is greater than 1, then at S426, the macro cell increases the ABS. If CBV is less than 1, then at S428, the macro cell decreases the ABS.

The ABS is increased or decreased. According to an embodiment, based on the CBV the ABS may be increased by a percentage e.g., 1%, 5% etc.

At S440, the macro cell configures a bitmap that reflects the increase or decrease in ABS.

At S445, the macro cell transmits the configured bitmap to the UE.

Figure 5:
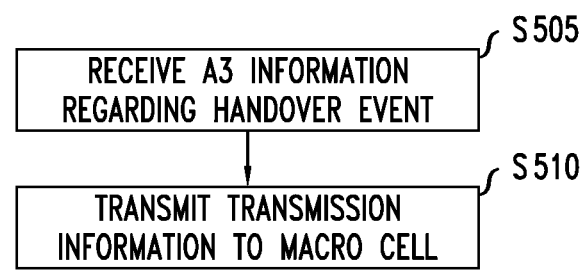

FIG. 5 illustrates a method of controlling a number of ABS in a heterogeneous network having a macro cell and at least one small cell according to an example embodiment of the present invention.

At S505, the small cell receives data regarding a handover event (A3 event). According to an embodiment, the received data includes RSRP and RSRQ discussed above.

At S510, the small cell transmits information to the macro cell. The information transmitted to the macro cell includes information used to determine the ratio between the estimated small cell-to-terminal transmission rate per resource unit and an estimated macro cell-to-terminal transmission rate per resource unit. According to an embodiment the transmitted information includes, the RSRP and RSRQ values as measured during the A3 events related to small cell to macro cell handovers. According to an embodiment, the transmitted information includes an Fi value or a percentage of ABS resources used by cell border terminals in the small cell. Cell border terminals are part of the small cell because of the cell range extension, due to the bias.

The methods described above and illustrated in FIGS. 4 and 5, can be implemented in a system as illustrated in FIG. 3, according to an example embodiment of the present invention. However, the methods illustrated in FIGS. 4 and 5 should not be limited to the system described in FIG. 3, and vice versa.

Figure 6A:
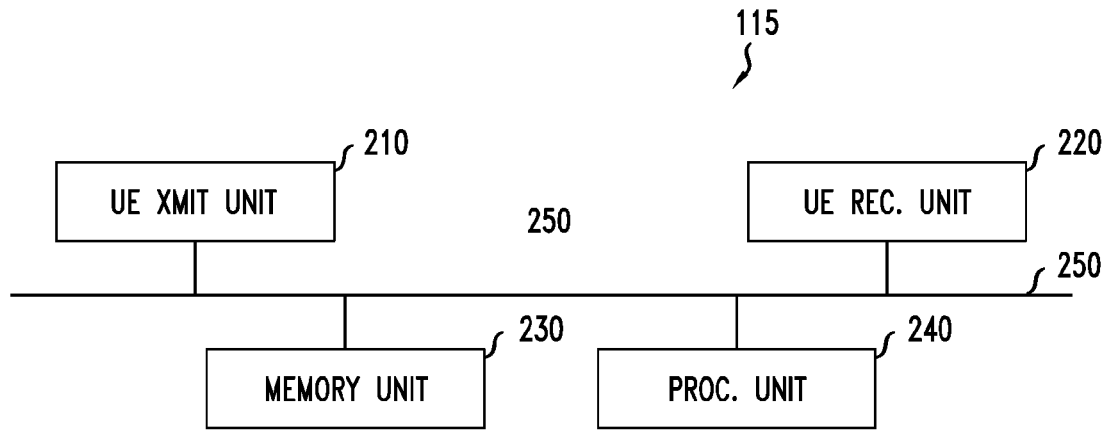
FIG. 6A illustrates an example embodiment of a UE shown in FIG. 1.

FIG. 6A illustrates an example embodiment of the UE 115.

The UE 115 is configured to determine channel conditions such as RSRP and RSRQ and location information.

The UE 115 may include, for example, a transmitting unit 210, a UE receiving unit 220, a memory unit 230, a processing unit 240, and a data bus 250.

The transmitting unit 210, UE receiving unit 220, memory unit 230, and processing unit 240 may send data to and/or receive data from one another using the data bus 250. The transmitting unit 210 is a device that includes hardware and any necessary software for transmitting wireless signals on the uplink (reverse link) including, for example, data signals, control signals, and signal strength/quality information via one or more wireless connections to other wireless devices (e.g., base stations).

The UE receiving unit 220 is a device that includes hardware and any necessary software for receiving wireless signals on the downlink (forward link) channel including, for example, data signals, control signals, and signal strength/quality information via one or more wireless connections from other wireless devices (e.g., base stations). The UE receiving unit 220 receives information from the serving base station $110_1$ and the small cell eNB 125.

The memory unit 230 may be any storage medium capable of storing data including magnetic storage, flash storage, etc.

The processing unit 240 may be any device capable of processing data including, for example, a microprocessor configured to carry out specific operations based on input data, or capable of executing instructions included in computer readable code.

Figure 6B:
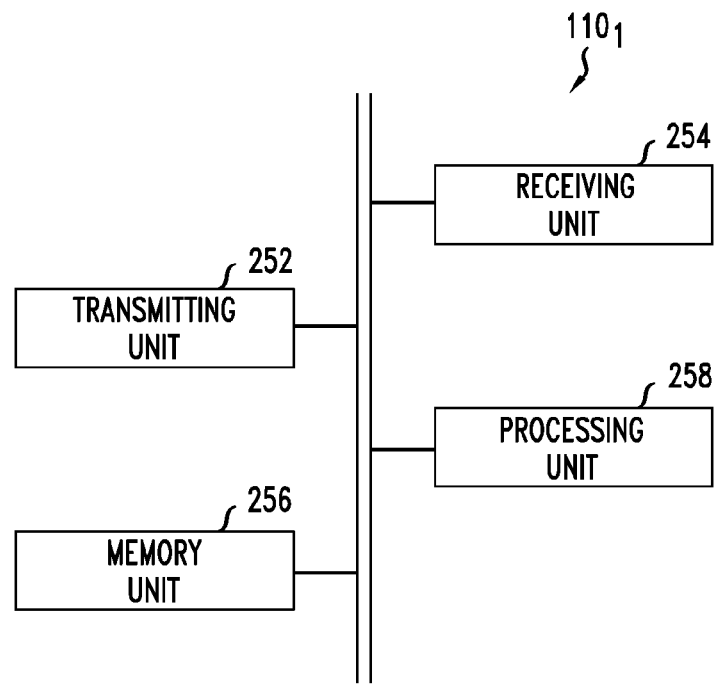
FIG. 6B illustrates an example embodiment of a base station shown in FIG. 1.

FIG. 6B illustrates an example embodiment of the macro eNB $110_1$.

Referring to FIG. 6B, the base station $110_1$ may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259. The transmitting unit 252 is a device that includes hardware and any necessary software for transmitting wireless signals including, for example, data signals, control signals, and signal strength/quality information via one or more wireless connections to other network elements in the wireless communications network 100.

The receiving unit 254 is a device that includes hardware and any necessary software for receiving wireless signals including, for example, data signals, control signals, and signal strength/quality information via one or more wireless connections to other network elements in the network 100.

The memory unit 256 may be any device capable of storing data including magnetic storage, flash storage, etc. The memory unit 256 is used for data and controlling signal buffering and storing for supporting pre-scheduling and the scheduled data transmissions and re-transmissions.

The processing unit 258 may be any device capable of processing data including, for example, a microprocessor configured to carry out specific operations based on input data, or capable of executing instructions included in computer readable code.

For example, the processing unit 258 is capable of determining a speed of the UE and controlling a HO from the serving base station to a second base station based on the speed of the UE, as described above. Furthermore, the processing unit 258 is configured to perform the calculations of the macro eNB $110_1$ that are described with reference to FIGS. 1-6B.

According to an embodiment, the UE sends the A3 event after handover, and after certain conditions where the reported measurement values do not precisely reflect the discriminative line between two cells (macro, small) but are slightly offset so as to avoid ping pong effects. These offsets are added to the respective $RSRP_{pico}$ or $RSRP_{macro}$ values so that a more precise reflection of the conditions at the discriminative line is captured and reported. In the case of the A3 offset value (in dB) this is straightforward, whereas in the case of the time-to-trigger value (in time), the change in RSRP may be estimated.

According to an embodiment, when a single handover and the associated rate ratio are not necessarily representative for the discriminative line between macro and pico, it is conceivable to collect rate ratios for given ABS/bias pairs over a longer time in a cumulative way and then use the arithmetic mean of each pair as a representative value for the rate ratio. According to an embodiment, this procedure can be combined with the added offsets discussed above.

According to an embodiment, the rate ratio analysis is integrated into the macro-small handover process. According to an embodiment, when a UE sends an A3 event to its serving macro cell, the macro cell may not decide to trigger a handover towards the small cell because the rate ratio analysis in combination with the small cell load (cell border) indicates that the amount of ABS should be decreased. Without the integration, the coverage area of the micro would shrink due to the decreased ABS and the terminal carrying out a macro to small handover would come right back to the macro cell. If the ratio rate analysis is integrated into the handover process such that the analysis is carried out before commanding the terminal to carry out a handover, ping pong effects are avoided.

According to an embodiment, changing the ABS and bias are coordinated in order to avoid short-term overload situations. The amount that the bias is changed is based on empirical knowledge.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of controlling a number of almost blank subframes (ABS) in a heterogeneous network having a macro cell base station and at least one small cell base station of a plurality of small cell base stations in a coverage area of the macro cell base station, the method comprising:
   receiving, at the macro cell base station, a plurality of measurements regarding both a received power and a received quality from a terminal;
   receiving, at the macro cell base station, a plurality of load-related values from a plurality of small cell base stations;
   determining, by the macro cell base station, a cost-benefit value (CBV) based on the plurality of measurements and the plurality of load-related values, the CBV indicating whether an increase or a decrease in the number of ABS would benefit the heterogeneous network, the determining the CBV includes calculating, for the at least one small cell base station and each of the plurality of small cell base stations, the CBV based on at least one ratio between an estimated small cell-to-terminal transmission rate per resource unit and an estimated macro cell-to-terminal transmission rate per resource unit; and
   selectively changing, by the macro cell base station, the number of ABS available to the at least one small cell base station based on the CBV.

2. The method of claim 1, wherein the plurality of measurements are based on at least one handover-related event between the macro cell base station and the at least one small cell base station.

3. The method of claim 1, wherein the CBV is determined when a threshold value for a load in the macro cell base station and for the at least one small cell base station, is reached.

4. The method of claim 1, wherein the determining the CBV further comprises:
   multiplying the at least one ratio by a load-related factor for the at least one small cell base station and each of the plurality of small cell base stations.

5. The method of claim 4, wherein the selectively changing the number of ABS further comprises:
   comparing a sum of the multiplied ratios across the at least one small cell base station and each of the plurality of small cell base stations with a threshold.

6. The method of claim 1, wherein triggering performance of the method is based on a handover-related event from the macro cell base station to the at least one small cell base station.

7. The method of claim 1, further comprising:
   determining, by the macro cell base station, if the at least one small cell base station has non-ABS resources, based on a resource threshold value (RTH); and
   reducing the CBV if the at least one small cell base station does not have adequate non-ABS resources.

8. A method of controlling a number of almost blank subframes (ABS) in a heterogeneous network having a macro cell base station and at least one small cell base station of a plurality of small cell base stations based on measurements received during a handover-related event from the at least one small cell base station to the macro cell base station, the method comprising:
   receiving data regarding the handover-related event;
   transmitting, to the macro cell base station, information for determining a ratio between an estimated small cell-to-terminal transmission rate per resource unit and an estimated macro-cell-to-terminal transmission rate per resource unit; and
   determining an amount of the available number of ABS according to claim 1.

9. A system for controlling a number of almost blank subframes (ABS) for a macro cell base station in a heterogeneous network having the macro cell base station and at least one small cell base station of a plurality of small cell base stations, wherein the system comprises:
   the macro cell base station, the macro cell base station including,
      a receiver configured to,
         receive a plurality of measurements regarding a received power and a received quality at a terminal, and
         receive a plurality of load-related values from the at least one small cell base station, and
      a processor configured to,
         determine a cost-benefit value (CBV) based on the plurality of measurements and the plurality of load-related values, the CBV indicating whether an increase or a decrease in the number of ABS would benefit the heterogeneous network, the CBV being determined by calculating, for the at least one small cell base station and each of the plurality of small cell base stations, the CBV based on at least one ratio between an estimated small cell-to-terminal transmission rate per resource unit and an estimated macro-cell-to-terminal transmission rate per resource unit, and
         selectively change the number of ABS available to the at least one small cell base station based on the CBV.

10. The system of claim 9, wherein the at least one small cell base station is embedded in a coverage area of the macro cell base station, and the at least one small cell base station is configured to:
    increase a cell range and increase an amount of supported traffic based on an increase in the available number of ABS; and
    decrease the cell range and decrease the amount of supported traffic based on a decrease in the available number of ABS.

\* \* \* \* \*